P. MacGAHAN.
RECORD MEASURING INSTRUMENT.
APPLICATION FILED NOV. 23, 1906.
1,010,160.
Patented Nov. 28, 1911.
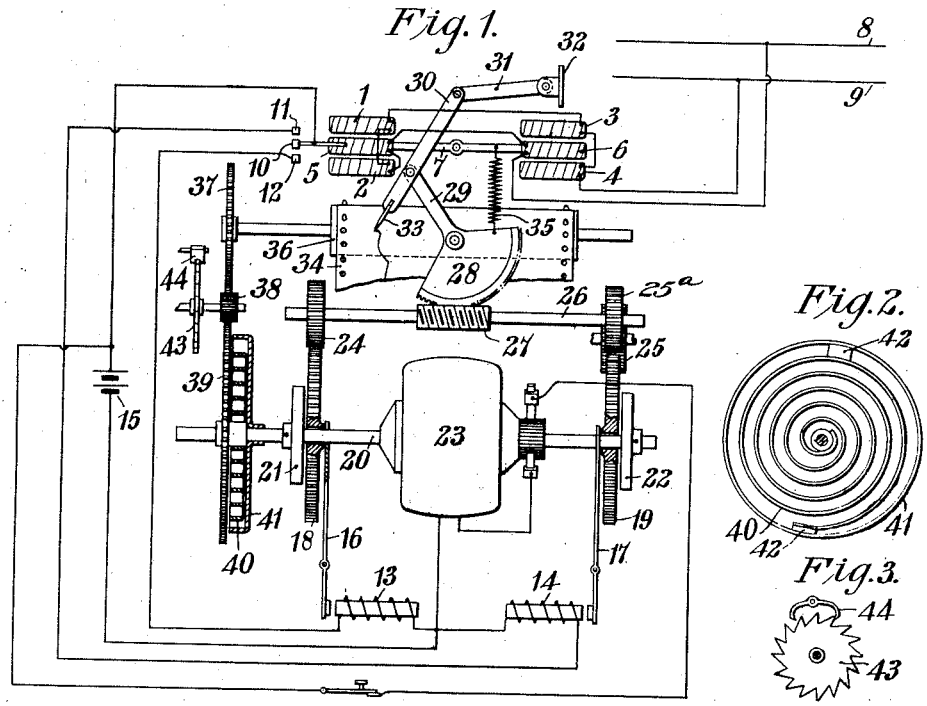
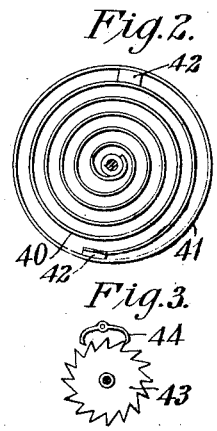
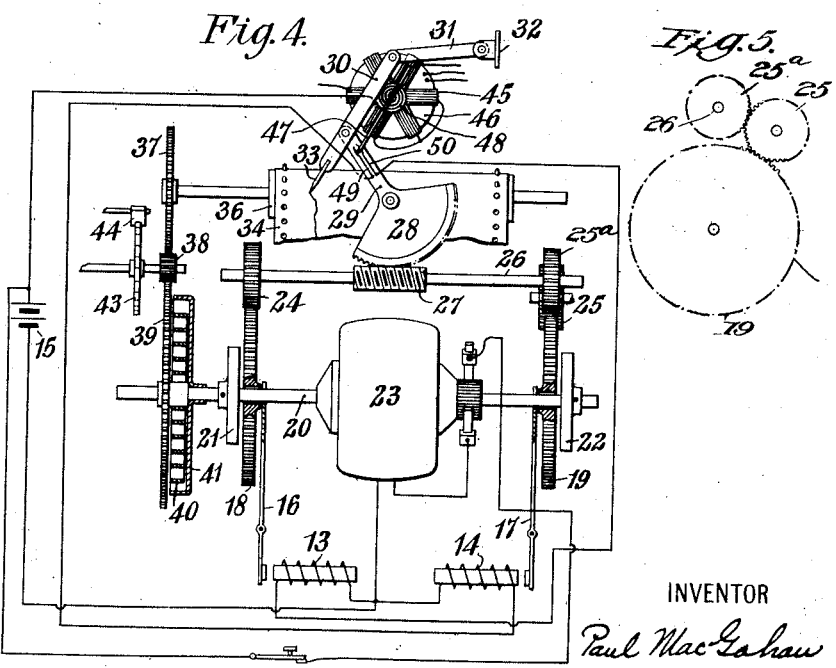
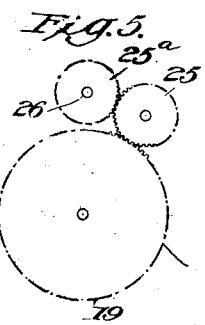
WITNESSES:
C. L. Belcher
Otto S. Schairer
INVENTOR
Paul MacGahan
BY
Wesley G. Carr
ATTORNEY

UNITED STATES PATENT OFFICE.

PAUL MacGAHAN, OF WILKINSBURG, PENNSYLVANIA, ASSIGNOR TO WESTINGHOUSE ELECTRIC & MANUFACTURING COMPANY, A CORPORATION OF PENNSYLVANIA.

RECORD MEASURING INSTRUMENT.

1,010,160.  Specification of Letters Patent.  Patented Nov. 28, 1911.

Application filed November 23, 1906. Serial No. 344,745.

*To all whom it may concern:*

Be it known that I, PAUL MACGAHAN, a citizen of the United States, and a resident of Wilkinsburg, in the county of Allegheny and State of Pennsylvania, have invented a new and useful Improvement in Record Measuring Instruments, of which the following is a specification.

My invention relates to measuring instruments, and particularly to those in which the measurements are continuously recorded.

The object of my invention is to provide an instrument of the character indicated that shall be simpler in construction and more satisfactory in service than others heretofore provided.

In one form of recording instrument, with which I am familiar, the recording mechanism is not actuated directly by the movable member of the instrument but is operated by a motor the direction of rotation of which is governed by the movable member, and the strip upon which the record is made is moved by means of independent clock work. According to the present invention, the motor is operated continuously in one direction and is connected to the recording mechanism by means of clutches that are governed by the movable member of the instrument, while the record strip is actuated by a means that embodies a spring which is maintained under stress by the motor.

Figure 1 of the accompanying drawing is a diagrammatic view of an instrument that embodies my invention. Figs. 2 and 3 are detail views of some of the parts of the instrument of Fig. 1, and Fig. 4 is a diagrammatic view of a different form of instrument from that shown in Fig. 1 that also embodies the invention. Fig. 5 is a view in end elevation of a portion of the driving gearing for the recording stylus.

A convenient form of instrument in connection with which the invention may be employed comprises a set of stationary coils 1, 2, 3 and 4 arranged in pairs, and coils 5 and 6 carried by a pivotally mounted frame 7 that is adapted to oscillate between the opposing faces of the coils constituting the respective pairs. As here shown, the coils 1 to 6, inclusive, are connected in series relation between supply conductors 8 and 9, in order that the instrument may operate as a voltmeter, though it will be readily understood that, if desired, the coils may be connected in series with a suitable external circuit for the purpose of causing it to operate as an ammeter, or that the circuits may be arranged in a suitable manner to cause the instrument to operate as a wattmeter or other desired form of instrument. The movable member of the instrument carries a switch arm 10 that is moved into and out of engagement with a pair of stationary contact terminals 11 and 12 by the oscillations of the movable member, the said parts constituting means for controlling the circuits of a pair of electro-magnets 13 and 14 that may be supplied with current from any suitable source, such as a storage battery 15. The magnets 13 and 14 are provided for the purpose of actuating a pair of levers 16 and 17, and thereby causing movement of gears 18 and 19, respectively, that are loosely mounted upon, and near opposite ends of, a shaft 20, into engagement with corresponding friction disks 21 and 22 that are rigidly mounted upon the shaft 20. The shaft is operated continuously in one direction by means of a motor 23 that may also be supplied with current from the storage battery 15 or from any other suitable source. The gears 18 and 19, respectively, mesh with gears 24 and 25, and the gear 25 meshes with another gear 25ª. The gears 24 and 25ª are rigidly mounted upon a shaft 26 having a screw-threaded portion 27 with which the toothed edge of a pivotally mounted sector 28 engages. The sector 28 constitutes one arm of a lever, the other arm 29 of which is pivotally secured to an intermediate point of another lever 30. The upper end of the lever 30 is connected by means of a link 31 to a stationary bracket 32. The lower end of the lever 30 is provided with a pencil, pen or other suitable marking device 33 that engages and makes a record upon a strip of paper 34. The parts 29, 30 and 31 constitute a parallel motion mechanism whereby the marking device 33 may be caused to move horizontally in a straight line across the face of the strip 34. The sector 28 is connected, by means of a tension spring 35, to the frame 7 that carries the movable coils 5 and 6 of the instrument, the spring serving to counterbalance the forces exerted between the stationary and movable coils of the instrument when the sector 28 has been caused, by the motor 23, to assume a position corresponding to the value of the forces measured. The strip 34 is moved by means of a feed and platen roll 36 that is actuated, through a set of gears 37, 38 and 39, by means of a spiral spring 40. The spiral spring is mounted within a barrel 41 that is carried at one end of the motor shaft 20 and is provided at suitable intervals with friction blocks 42 that may engage the inner cylindrical surfaces of the barrel 41 with sufficient pressure to cause winding of the spring 40 when the same has become uncoiled a predetermined amount. In this manner, the motor serves to maintain the spring under stress. The rate of movement of the strip 34 may be governed by any suitable escapement mechanism, such as that comprising a ratchet 43 and a pawl 44.

If, during the operation of the instrument, the voltage of the circuit 8—9 increases, the switch arm 10 will be moved into engagement with stationary contact terminal 12 and the circuit of magnet 13 will become established. Gear 18 is then moved, by means of the lever 16, into engagement with friction disk 21, and the motion of the shaft 20 will be transmitted to the shaft 26, the lever comprising arms 28 and 29 being thereby rotated in a clockwise direction. The pen 33 is thus moved from left to right across the face of the strip 34 until the tension of the spring 35 exactly counterbalances the forces exerted between the stationary and movable coils of the instrument. If the voltage of the circuit 8—9 decreases, the tension of the spring overbalances the forces exerted between the movable coils of the instrument, and switch arm 10 is thereby moved into engagement with stationary contact terminal 11, the circuit of magnet 14 being thereby established. The gear 19 is then moved into engagement with friction disk 22 by the lever 17, and the shaft 26 is caused to rotate in such a direction that the lever 28—29 is turned in a counter-clockwise direction, while the pen 33 is moved from right to left across the face of the strip 34. These operations continue until the forces exerted between the stationary and movable coils of the instrument balance the tension of the spring 35.

Another form of instrument in connection with which my invention may be conveniently employed is a power-factor or phase-indicating meter, such as that which forms the subject-matter of Patent No. 695,913, granted to Westinghouse Electric & Manufacturing Company, as assignee of Frank Conrad. The instrument, as here shown, comprises a stationary member 45 and a rotatable member 46 that carries a switch arm 47 to which current is conducted by means of a spiral spring 48. The free end of the switch arm 47 is located between a pair of flexible contact terminals 49 and 50 that are mounted upon the lever arm 29 and that are connected, respectively, to the terminals of magnets 13 and 14. The remainder of the structure of the instrument may be substantially as shown in Fig. 1. In the operation of this instrument, the movable member 46 is rotated by the forces exerted upon it by the stationary member, and if such forces cause a counter-clockwise rotation of the member the switch arm 47 will be caused to engage the contact terminal 50 and to thereby establish the circuit of magnet 13. The lever 28—29 will then be rotated in a clockwise direction in a manner which will be readily understood from the foregoing description, and the pen 33 will be moved from left to right across the face of the record strip 34. The lever 28—29 will thus be rotated until the contact terminal 50 becomes disengaged from switch arm 47. If the switch arm 47 is rotated in a clockwise direction by the forces that are exerted in the instrument, it will be caused to engage contact terminal 49, the circuit of solenoid 13 being thereby established. The lever arm 28—29 will then be caused to rotate in a counter-clockwise direction and the pen 33 will be moved from right to left across the record strip 44 until the contact terminal 49 becomes disengaged from the arm 47.

In its structure and arrangement of parts, the instrument may, of course, differ considerably from what has been here shown and described without altering the mode of operation or departing materially from the spirit of the invention, and I desire that all such modifications shall be included within its scope.

I claim as my invention:

1. The combination with a measuring instrument having a movable member, a recording device and a record strip carrier, of a motor that operates continuously in one direction, means governed in operation by the movable member of the instrument for connecting the recording device to the motor, and a yielding means that is maintained under stress by the motor to cause movement of the record strip carrier.

2. The combination with a measuring instrument having a movable member, a recording device and a record strip carrier, of a motor that operates continuously in one direction, means governed in operation by the movable member of the instrument for connecting the recording device to the motor, and a spring that is maintained under stress by the motor to cause movement of the record strip carrier.

3. The combination with a measuring instrument having a movable member, a recording device and a record strip carrier, of a motor that operates continuously in one direction, means governed in operation by the movable member of the instrument for connecting the recording device to the motor, a spiral spring for driving the record strip carrier and a casing or barrel carried by the motor shaft and making frictional engagement with said spring.

In testimony whereof, I have hereunto subscribed my name this 6th day of November, 1906.

PAUL MacGAHAN.

Witnesses:
 WM. BRADSHAW,
 BIRNEY HINES.